US009828974B2

(12) United States Patent
Oney

(10) Patent No.: US 9,828,974 B2
(45) Date of Patent: Nov. 28, 2017

(54) DEEP SEA WATER EXTRACTION FOR SOURCE OF COOLING IN OFFSHORE OPERATIONS

(71) Applicant: Stephen K. Oney, Manassas, VA (US)

(72) Inventor: Stephen K. Oney, Manassas, VA (US)

(*) Notice: Subject to any disclaimer, the term of this patent is extended or adjusted under 35 U.S.C. 154(b) by 473 days.

(21) Appl. No.: 14/207,846

(22) Filed: Mar. 13, 2014

(65) Prior Publication Data

US 2014/0262138 A1    Sep. 18, 2014

Related U.S. Application Data

(60) Provisional application No. 61/781,546, filed on Mar. 14, 2013.

(51) Int. Cl.
*F03G 7/05* (2006.01)
*F25D 1/02* (2006.01)

(52) U.S. Cl.
CPC ........ *F03G 7/05* (2013.01); *F25D 1/02* (2013.01)

(58) Field of Classification Search
CPC ... F24J 2200/06; F24J 3/00; F24J 3/06; F03G 7/05; F25D 1/02
USPC .......................................................... 165/45
See application file for complete search history.

(56) References Cited

U.S. PATENT DOCUMENTS

| 3,440,146 A | 4/1969 | Louw ............................ 203/11 |
| 3,467,013 A | 9/1969 | Conner ........................ 417/244 |
| 3,468,762 A | 9/1969 | Klitzsch ....................... 202/186 |
| 3,841,254 A | 10/1974 | Dragonas ..................... 114/77 |
| 3,928,145 A | 12/1975 | Othmer ........................ 203/11 |
| 4,078,975 A | 3/1978 | Spears, Jr. .................... 203/10 |
| 4,172,766 A | 10/1979 | Laing et al. ................ 202/173 |
| 4,233,153 A | 11/1980 | Hammel et al. ............. 203/10 |
| 4,269,030 A * | 5/1981 | Osborne ................. F03G 7/04 60/641.1 |
| 4,293,240 A | 10/1981 | Ogimoto et al. ........... 405/195 |
| 4,302,297 A | 11/1981 | Humiston ............... 202/185 R |
| 4,311,012 A * | 1/1982 | Finley .................... A01K 61/00 60/641.7 |
| 4,356,785 A | 11/1982 | Baile .......................... 114/264 |

(Continued)

FOREIGN PATENT DOCUMENTS

DE    197 34 981 A1    6/1998
DE    102 11 788 A1    10/2003
(Continued)

OTHER PUBLICATIONS

Lampe, H., et al., "PCS-Preussag Conversion System Mobile Floating Seawater Desalination Plant", Desalination 114, pp. 145-151, (1997).

(Continued)

*Primary Examiner* — Devon Russell
(74) *Attorney, Agent, or Firm* — Smith, Gambrell & Russell, LLP

(57) ABSTRACT

The present invention relates to the utilization of deep ocean seawater in cooling water for offshore process applications. The present invention contemplates extracting deep seawater from regions of the ocean having minimal biological productivity for use as cooling water in offshore operations. In one embodiment, a sea water extraction system according to the invention may include a submersible pump, a pipe and riser, a floating vessel, a transfer pipe, and a cooling water heat exchanger system.

14 Claims, 5 Drawing Sheets

(56) References Cited

U.S. PATENT DOCUMENTS

| | | | |
|---|---|---|---|
| 4,452,696 A | 6/1984 | Lopez | 210/170.11 |
| 4,568,522 A | 2/1986 | Corbett | 422/186 |
| 4,618,421 A | 10/1986 | Kantor | 210/170.09 |
| 4,993,348 A | 2/1991 | Wald | 114/265 |
| 5,229,005 A | 7/1993 | Fok et al. | 210/652 |
| 5,306,397 A | 4/1994 | Schmidt | 203/11 |
| 5,582,691 A | 12/1996 | Flynn et al. | 203/11 |
| 5,840,159 A | 11/1998 | Rosenblad | 203/10 |
| 5,914,041 A | 6/1999 | Chancellor | 210/641 |
| 5,970,846 A | 10/1999 | Roehr | 99/276 |
| 6,223,669 B1 | 5/2001 | Bowden | 114/65 |
| 6,694,910 B1 | 2/2004 | Sharapov | 114/264 |
| 7,153,423 B2 | 12/2006 | Gordon | 210/242.1 |
| 7,306,724 B2 | 12/2007 | Gordon | 210/241 |
| 7,455,778 B2 | 11/2008 | Gordon | 210/652 |
| 7,510,658 B2 | 3/2009 | Gordon | 210/652 |
| 7,658,843 B2 * | 2/2010 | Krock | B01D 61/025 210/170.01 |
| 8,375,716 B2 * | 2/2013 | Ramaswamy | F01K 25/10 60/641.1 |
| 2003/0024803 A1 | 2/2003 | Max | 203/10 |
| 2004/0065614 A1 | 4/2004 | Gordon et al. | 210/650 |
| 2004/0084156 A1 | 5/2004 | Hata | 159/47.1 |
| 2004/0206681 A1 | 10/2004 | Gordon | 210/259 |
| 2005/0082214 A1 | 4/2005 | Max | 210/220 |
| 2008/0290032 A1 | 11/2008 | Ton That | 210/651 |
| 2009/0250398 A1 * | 10/2009 | Meller | B01D 61/025 210/636 |
| 2012/0125561 A1 * | 5/2012 | Levings | F03G 7/05 165/45 |
| 2012/0283458 A1 * | 11/2012 | Morgenthaler | C10L 1/02 554/8 |
| 2012/0285392 A1 * | 11/2012 | Morgenthaler | A01K 61/02 119/230 |
| 2014/0014199 A1 * | 1/2014 | Edwards | F03G 7/05 137/356 |
| 2014/0096519 A1 * | 4/2014 | Hermant | F03G 7/05 60/641.7 |

FOREIGN PATENT DOCUMENTS

| | | |
|---|---|---|
| EP | 0 968 755 A | 1/2000 |
| ES | 2 165 824 A1 | 3/2002 |

OTHER PUBLICATIONS

U.S. Appl. No. 11/513,602, filed Aug. 2006.
U.S. Appl. No. 11/471,747, filed Jun. 2006.
International Search Report dated Jul. 1, 2014 of corresponding International Patent Application No. PCT/US14/23701.

* cited by examiner

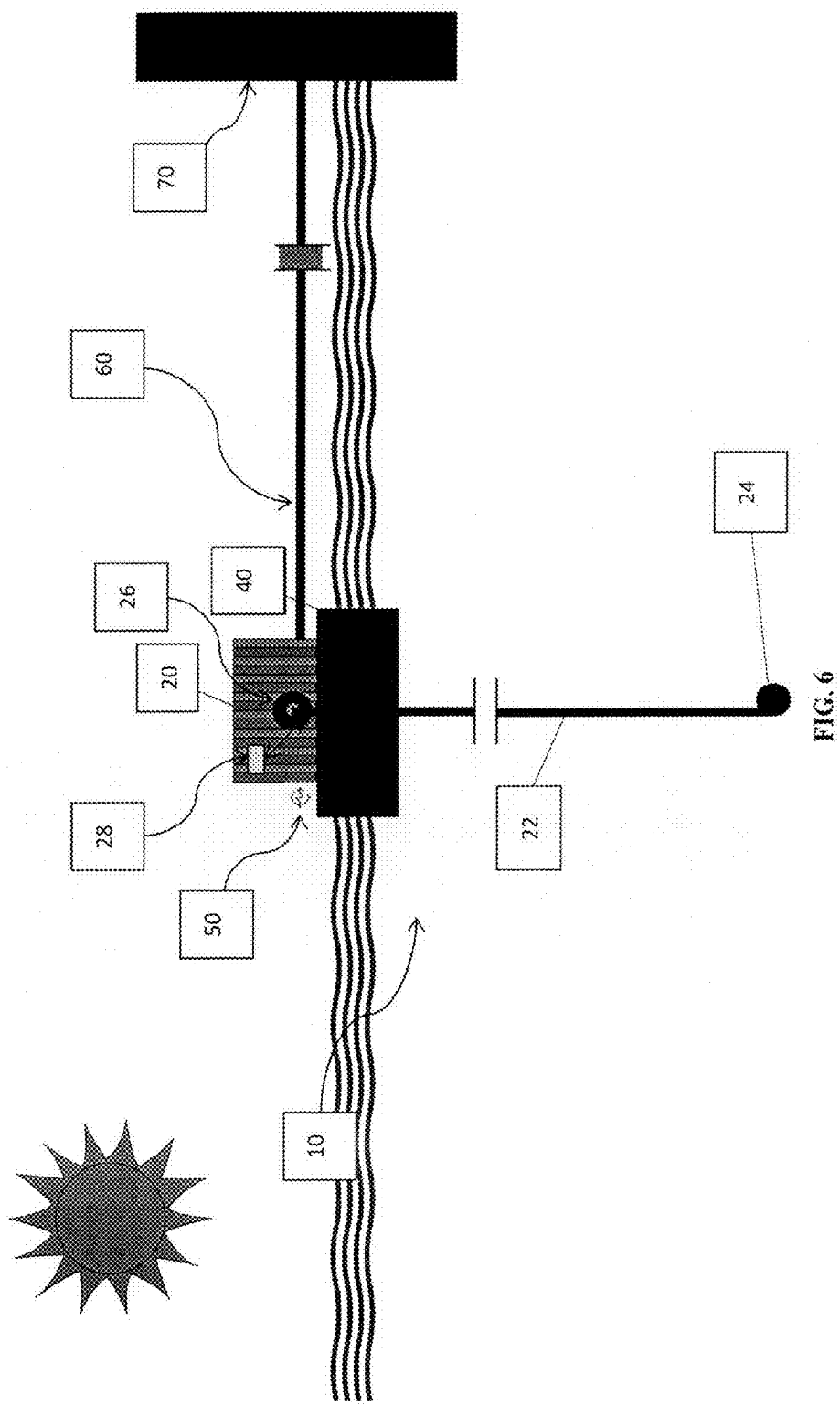

DEEP SEA WATER EXTRACTION FOR SOURCE OF COOLING IN OFFSHORE OPERATIONS

CROSS-REFERENCE TO RELATED APPLICATIONS

This application claims priority to U.S. Provisional Patent Application No. 61/781,546, which was filed on Mar. 14, 2013, the entire disclosure of which is incorporated by reference herein.

FIELD OF THE INVENTION

The present invention is directed to deep sea water extraction for use in offshore operations. In particular, the present invention relates to a system and method for extracting deep ocean sea water for use as cooling water for offshore operations, such as oil drilling platforms and rigs, LNG plants, and regasification plants.

BACKGROUND OF THE INVENTION

Offshore oil drilling platforms and rigs typically utilize surface seawater as the cooling medium for the operational generators that are required to power the rig and support operations. Similarly, offshore liquefied natural gas (LNG) plants and regasification plants traditionally use surface seawater as both a heat sink and a cooling medium. Relatively large flows of water are required to provide the cooling medium necessary to efficiently operate the power and liquefaction systems, respectively. Surface water is typically received for these purposes at 20-30° C. in the tropical and sub-tropical regions (i.e., Gulf of Mexico, South America, and the like). As latitudes increase, the surface water temperatures lower.

In almost all cases, there are occasionally issues with limitations of operation as the intake and discharge are subject to EPA or similar regulations on the chemical, biological, and thermal properties of these resources and return streams. Specifically, in the U.S., EPA regulations 316(a) and 316(b) restrict the temperature elevation limits of the cooling water discharge (316(a)) and the impingement/entrainment characteristics (316(b)) of the cooling water intake. In the Gulf of Mexico and many tropical and sub-tropical locations, this surface water is often the primary region of important commercial fishery larvae and early life-stages that are very sensitive to entrainment into such intake systems due to the fact they have little ability to avoid intake streams and imposed currents. This can put a significant burden and stress on the regional fishery and, hence, has become a sensitive environmental point of contention between offshore drillers, LNG operators, and local fishermen and environmental groups.

The current intake for the aforementioned cooling systems typically occurs at or near depths of productivity maximums. Accordingly, there are clear environmental impacts to uncontrolled cooling water intake and discharge within this biologically sensitive region. In addition, there are potentially significant impacts to localized and regional fisheries for strategic commercial species.

Moreover, the relatively high temperature of the intake waters in some areas (20-30° C.) and the regulations on the return water occasionally require offshore systems to shut down operations on off-design warm days to accommodate and meet the environmental requirements imposed. These shutdowns and delays in operation are costly in any industry, but especially so in offshore operations.

Thus, there remains a need in the art for a system and method to draw cooling water for offshore operations from regions of minimal biological productivity so as to lessen the environmental impact, prevent disruptions of operations, reduce or eliminate biofouling issues in system heat exchangers and improve cost effectiveness of the cooling water resource. In addition, initially cooler heat sink temperatures are needed to improve generator efficiency, reduce operational costs, lower resource water flow rates, lower environmental impact, and improve operational reliability. Obviously, a cooler, less environmentally sensitive cooling water resource would be useful to all stakeholders—oil rig/LNG operators, offshore construction contractors, fishermen, and other environmental proponents.

SUMMARY OF THE INVENTION

The systems and methods described may be applied to the offshore oil, LNG, offshore construction, and other offshore process applications that require process cooling water for either energy generation or as a low-cost heat sink for other energy intensive processes (e.g., liquefaction/regasification). In particular, if extracted at a certain depth, ocean water may provide a plurality of benefits to the process operator including, but not limited to, efficiency improvements, reliability improvements, reduced biofouling concerns and treatments and/or environmental impact improvements.

Accordingly, the present invention relates to the utilization of deep ocean seawater in cooling water for offshore process applications. In particular, one embodiment of the present invention is directed to a system for extraction of sea water including a floating barge comprising a pipe and a pump, wherein the pipe extends at least about 100 meters into the ocean, and wherein the pipe and pump are operatively connected and together capable of extracting water from the ocean at a depth of at least about 100 meters and a receiving device capable of using the extracted sea water for cooling.

In a second embodiment, the present invention is directed to a system for extraction of sea water including a floating barge comprising a pipe and a pump, wherein the pipe extends at least about 100 meters into the ocean, and wherein the pipe and pump are operatively connected and together capable of extracting water from the ocean at a depth of at least about 100 meters; a feedback system capable of measuring at least one measurement of ocean biology productivity; a cooling water heat exchanger; a transfer pipe capable of moving the extracted sea water; and a receiving device capable of using the extracted sea water for cooling.

The present invention is also directed to a method for cooling water in offshore operations including providing an extraction system comprising a flexible pipe having a first end and a second end, wherein the first end is operatively connected to an offshore platform and the second end is extendable to at least about 100 meters into the ocean, and a submersible pump operatively connected to the second end; extending the extraction system to an extraction depth, wherein the extraction depth is at least about 100 meters; and pumping sea water from the extraction depth to the offshore platform.

The systems and methods of the present invention may also provide cooler intake water such that the generator performance is improved. A potential benefit is that the improvement in generator performance will provide more energy than the additional pumping power required for extracting the deep ocean water.

BRIEF DESCRIPTION OF THE DRAWINGS

Further features and advantages embodiments of the present invention can be ascertained from the following detailed description that is provided in connection with the drawing(s) described below:

FIG. 6 is a schematic of an intake system according to one embodiment of the present invention.

DETAILED DESCRIPTION OF THE INVENTION

Figure 1:
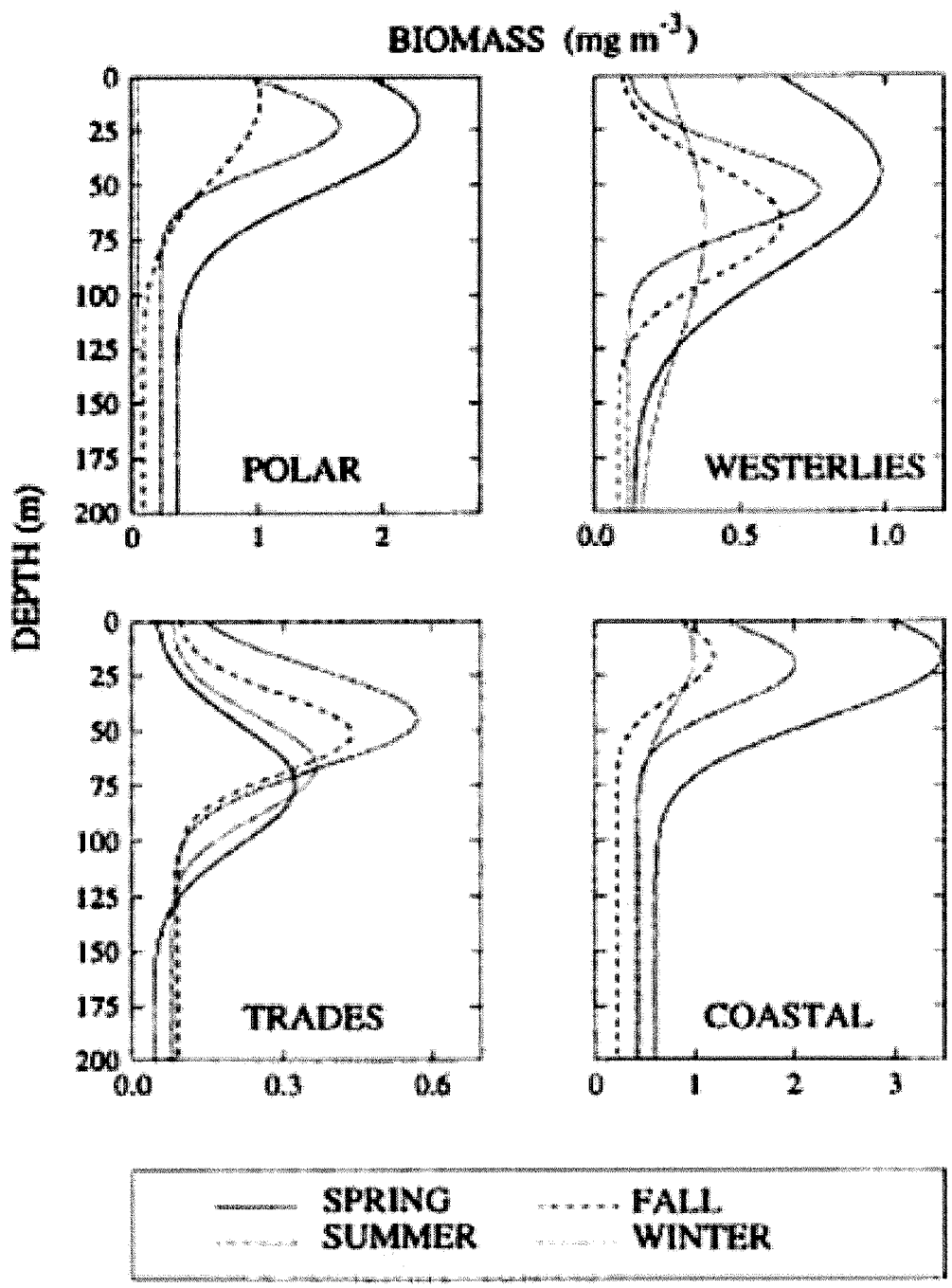
FIGS. 1-4 illustrate oceanic productivity and temperature profiles.
Figure 2:
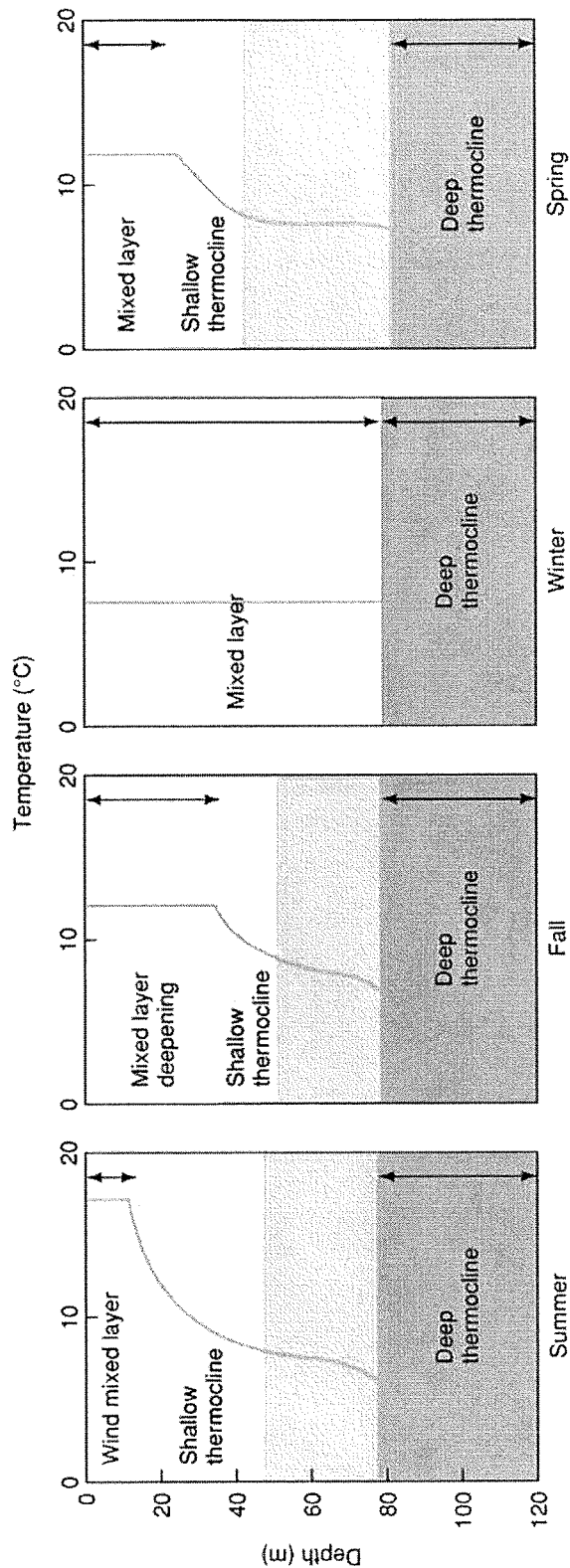

The present invention contemplates systems and methods for extracting deep sea water from regions of the ocean having minimal biological productivity The extracted sea water may be used for a number of different purposes, such as providing cooling water for use in offshore devices. For example, the extracted sea water may be provided for use in cooling water for offshore rigs, LNG and regasification plants, and similar operations. However, the sea water may also be provided to land-based or shore-based operations As discussed briefly above, the depth from which the sea water of the present invention is extracted is important for numerous reasons. One factor to consider when extracting sea water is the amount of biomass present at a given depth. The amount of biomass can vary based on the latitude, depth, and time of the year, e.g., season. Along these lines, FIG. 1 shows the typical ocean productivity by depth for various ocean locations during different seasons. As demonstrated by the graphs of FIG. 1, the productivity, e.g., biomass, generally increases at depths closest to the surface and then tapers off as the availability of sunlight and nutrients decreases with depth. For example, in the polar regions, the maximum productivity is greatest around a depth of about 25 meters during all seasons (although the maximum productivity is greatest in the spring). FIG. 2 also shows the seasonal progression of productivity. Specifically, FIG. 2 demonstrates the change in the shallow and deep thermocline layers over the different seasons of the year. As can be seen from FIG. 2, the shallow thermocline layer gets progressively deeper from the summer to the fall until the shallow thermocline layer turns into a mixed layer in the winter.

Figure 3:
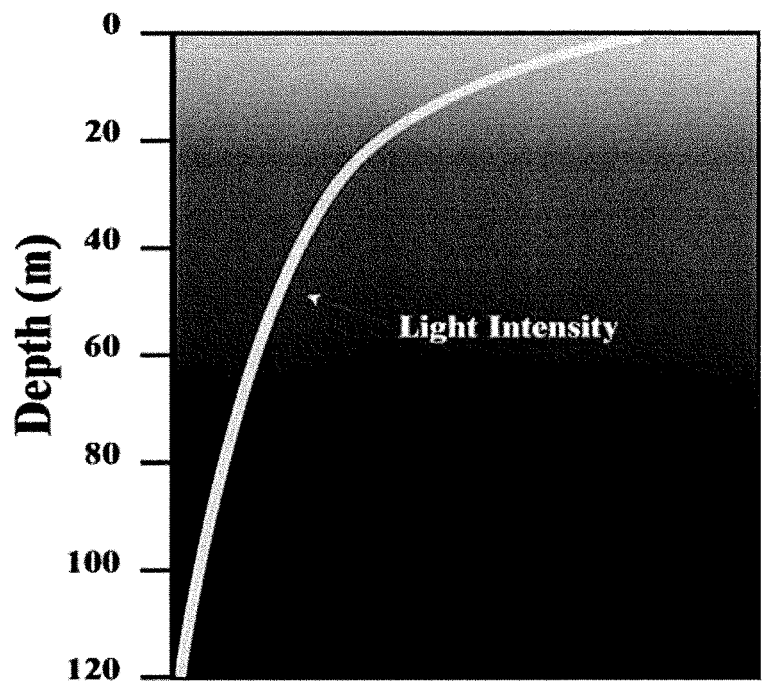
Figure 4:
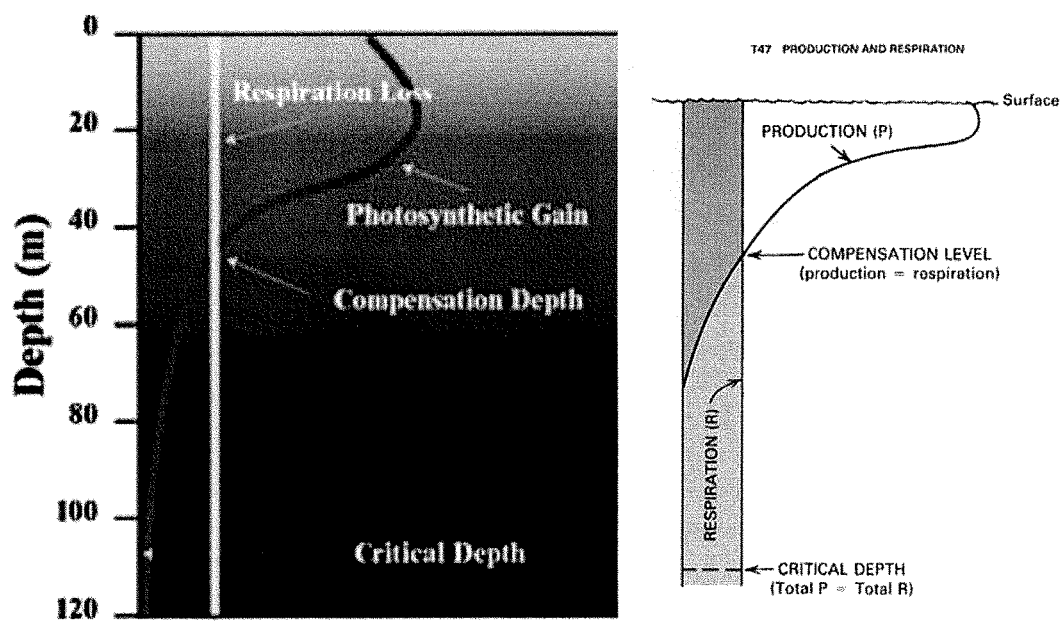

Another factor to consider when extracting sea water is the amount of sunlight at a given depth. FIG. 3 shows the vertical distribution of sunlight in the ocean. As shown in the graph of FIG. 3, the light intensity decreases as the ocean depth increases. In addition, FIG. 4 displays the regions of critical productivity in the ocean based upon photosynthesis. As displayed in FIG. 4, the critical depth, located at about 110 meters, indicates the depth at which photosynthesis is no longer able to occur.

Figure 5:
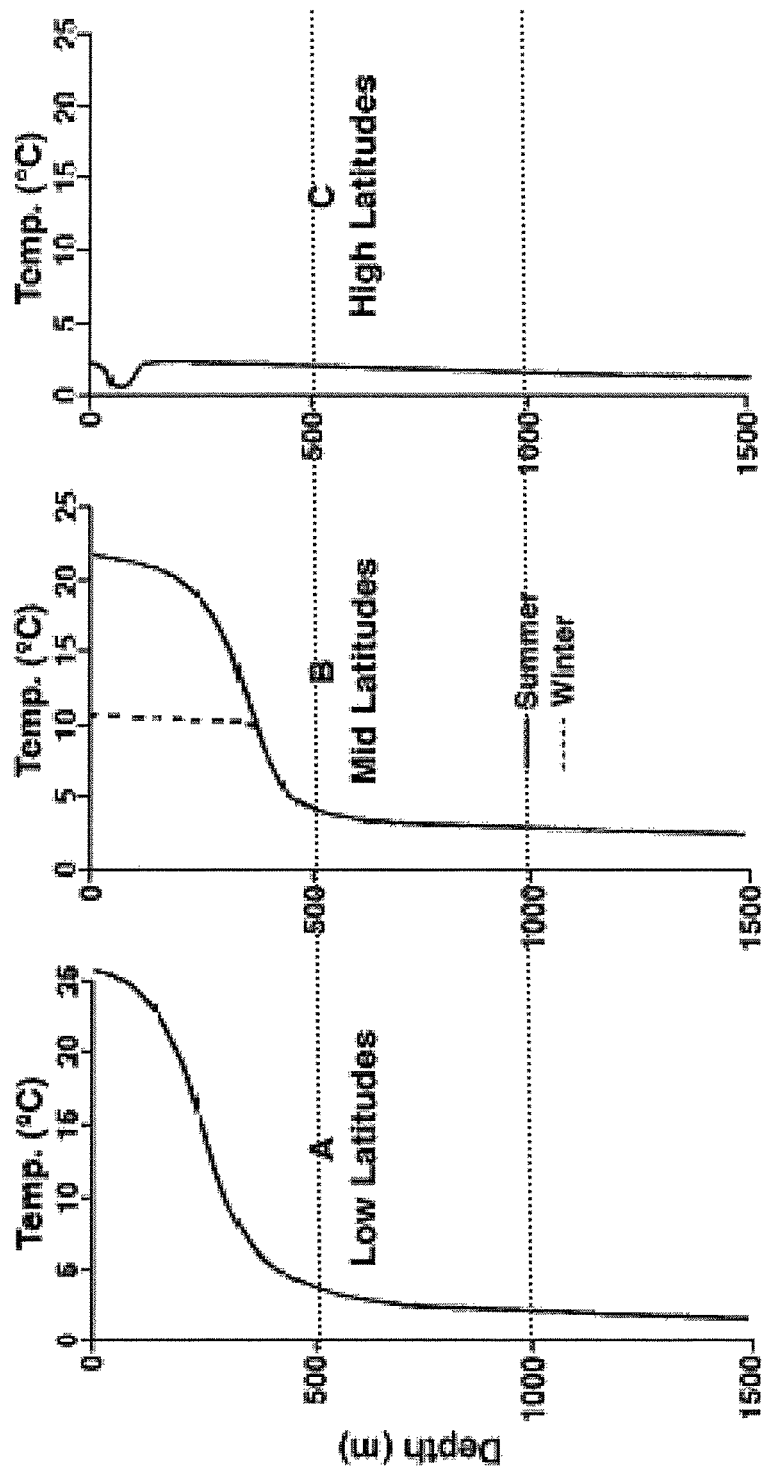
FIG. 5 illustrates oceanic temperature profiles and the extraction zone according to one embodiment of the invention.

The depth from which the seawater of the present invention is extracted depends on varying factors. However, as shown in FIG. 5, regardless of the latitude, the extraction depth contemplated by the present invention is at least about 500 meters. In another embodiment, the extraction depth is about 500 meters to about 1000 meters. However, it also contemplated that the extraction depth may be less than about 500 meters in certain latitudes and/or in certain seasons. In fact, the extraction depth may be any depth below the natural thermocline to draw from the non-productive region of the ocean. For example, in one embodiment, the extraction depth may be at least about 100 meters in high latitude locations or in mid latitude locations during winter. In this aspect, the extraction depth may be from about 100 meters to about 1000 meters. In another embodiment, the extraction depth may be at least about 250 meters. In this aspect, the extraction depth may be from about 250 meters to about 1000 meters. Furthermore, while 1000 meters is used as the high end of the range depth for extraction in FIG. 5, it is contemplated that the extraction depth may be more than 1000 meters providing the system equipment is not adversely affected by the additional depth.

The sea water extraction system of the present invention may include any type of pressure regulating device, e.g., a pump. The system of the present invention may also include a fluid conveyance or carrying apparatus. The fluid conveyance apparatus may include any type of apparatus that can carry a fluid from one location to another while maintaining the structural integrity of the apparatus, e.g., a pipe or hose. In particular, a sea water extraction system according to the invention may include a submersible pump, a pipe and riser, a floating vessel, a transfer pipe, and a cooling water heat exchanger system.

In one embodiment, the extraction may occur using the method of sea water extraction disclosed in U.S. Pat. No. 7,658,843, the entire disclosure of which is incorporated by reference herein. In one embodiment, the extraction may occur using a sea water pump that pumps the sea water into a flexible pipe or riser onto a floating vessel or platform, where it is transferred to or fed into the cooling water need.

In another embodiment, the system of the invention includes a floating vessel, barge, ship, buoy, or the like that houses a winch for deployment and retrieval of a deep water hose and, optionally, the pump. Once the pipe and, optionally, the pump, has been deployed to the desired depth, the pump is operated to pump sea water to the intended destination for use as cooling water. For example, based on the variation expected in thermocline and associated euphotic zone over seasonal variation as shown in FIG. 2, the retractable option provides depth change ability for different seasons to avoid biological considerations when necessary. In this aspect of the present invention, the system may also include a positive or negative feedback system. The feedback system may include a measurement system capable of measuring ocean biology productivity and/or temperature. Examples of measurements of ocean biology productivity include, but are not limited to, amount of biomass, amount of sunlight, and amount of nutrients at a given depth. In response to the productivity and/or temperature measurements, the depth of the pipe or hose may be increased or decreased. For example, the depth of the pipe or hose may be decreased to get colder water and/or water with less productivity.

In another embodiment, the floating vessel includes a pump and a rigid pipe or hose that is fixed to the surface of the vessel but extends to the extraction zone. The pipe or riser may also be fixed directly to the offshore platform.

The pump of the present invention may be submerged or partially submerged in the ocean. In one embodiment, the pump may be a submersible pump that is disposed at the submerged end of the riser and thus deployed into the sea to the extraction zone. Any practicable pump design may be employed within the scope of the present disclosure.

FIG. 6 shows a basic schematic according to one embodiment of the invention. For example, the extraction system 10 may generally include a floating vessel, barge, ship, buoy, or the like 40 that houses a fluid extraction apparatus 20 including a winch 26 for deployment and retrieval of a deep water hose 22 and, optionally, the pump 24, as well as the feedback system 28 referred to above to measure ocean biology productivity and/or temperature to adjust the depth of deployment of the hose 22. Once the hose 22 and, optionally, the pump 24, has been deployed to the desired depth, the pump 24 is operated to pump sea water to the intended destination for use as cooling water. In this example, the deep water may be fed to a cooling water heat exchanger system 50 and then returned to the surface in a similar manner. Without being bound by any particular theory, operating with cold water extracted as presently described and subsequently returning the discharge to the surface layer under current systems may allow for much more efficient usage of the cold water and reduce cooling water flows. For example, heat exchange is more efficient due to higher temperature change across the heat exchanger system because the colder water can absorb much more heat prior to discharge and still stay within EPA regulations.

In one embodiment, a transfer pipe 60 provides the extracted deep sea water directly to the offshore operation 70. In another embodiment, the extracted sea water may be pumped directly to a land-based operation via the transfer pipe 60. In yet another embodiment, the extracted deep sea water may be transported from the floating platform to the offshore or land-based operation.

The system of the present invention may be located in a variety of geographical areas. Suitable locations include, but are not limited to, oceans in sub-tropical and tropical regions. Without being bound by any particular theory, it is believed that locating the system of the invention in an equatorial area may limit exposure to disruptive weather and sea conditions. For example, +/−5° North and South Latitude represents areas of very low storm exposure. In one embodiment, the system may be designed in a manner to allow transport or movement to protect from predicted storm activity. In another embodiment, the system may be designed with a fixed, stationary location with rigid pipe and pumping system located at the surface providing the cooling water through a suitable manifold delivery system.

The present invention is contemplated for use in oil rigs, LNG plants, regasification plants, offshore construction vessels, and other offshore operations requiring cooling water. There are currently over 100 deep water oil drilling rigs in tropical and sub-tropical waters that could effectively utilize the systems and methods of the present invention for operational improvement. This technology would improve systems located in intermediate depth locations as well. LNG plants and regasification plants will also benefit from the systems and methods of the present invention in that the large volume of heat sink water required to operate these systems may be supplied with the extracted sea water. While the disclosure is focused mostly on the use of the present invention in extraction of sea water for end uses of cooling in offshore operations, other end uses of the present invention, including commercial applications, are contemplated.

The invention described and claimed herein is not to be limited in scope by the specific embodiments herein disclosed, since these embodiments are intended as illustrations of several aspects of this invention. Any equivalent embodiments are intended to be within the scope of this invention. Indeed, various modifications of the invention in addition to those shown and described herein will become apparent to those skilled in the art from the foregoing description.

Such modifications are also intended to fall within the scope of the appended claims.

The invention claimed is:

1. An offshore cooling system comprising:
    a floating vessel comprising a fluid conveyance apparatus comprising a pipe, a pump, and a feedback system, wherein the fluid conveyance apparatus is operable to deploy and retract the pipe and the pump to and from an extraction depth below the ocean surface, wherein the extraction depth is at least 100 meters, wherein the pipe and pump are operatively connected and together operable to extract water from the extraction depth, and wherein the feedback system is operable to measure at least two measurements selected from the group consisting of biomass amount, sunlight amount, nutrient amount, and temperature at the extraction depth; and
    a receiving device comprising a transfer pipe operable to receive the extracted sea water from the fluid conveyance apparatus and transfer the extracted sea water for use as cooling water in a preexisting offshore operation.

2. The system of claim 1, wherein the fluid conveyance apparatus further comprises a winch operable to deploy and retrieve the pipe and pump to variable depths within 100 meters to 1000 meters.

3. The system of claim 1, wherein the pump is a submersible pump disposed at a submerged end of the pipe.

4. The system of claim 1, wherein the preexisting offshore operation is separate from the floating vessel.

5. The system of claim 1, wherein the extraction depth is at least 500 meters.

6. The system of claim 1, further comprising a cooling water heat exchanger system.

7. The system of claim 2, wherein the extraction depth is variable between 100 meters to 1000 meters based on the measured ocean biology productivity and temperature.

8. An offshore cooling system comprising:
    a floating vessel at a first offshore location comprising a fluid conveyance apparatus operable to retractably extend to an extraction depth below the ocean surface, wherein the fluid conveyance apparatus comprises a pipe, a pump, and a feedback system operable to measure (i) at least one measurement of ocean biology productivity selected from the group consisting of biomass amount, sunlight amount, and nutrient amount and (ii) temperature, wherein the pipe and pump are operatively connected and together operable to extract sea water from the ocean at the extraction depth, wherein the extraction depth is from 100 meters to 1000 meters, and wherein the extraction depth is variable based on the (i) measured ocean biology productivity and (ii) temperature;
    a cooling water heat exchanger; and
    a transfer pipe operable to transport the extracted sea water to a second offshore destination, wherein the second offshore destination receives the extracted sea water and uses the extracted sea water as cooling water.

9. The system of claim 8, wherein the extraction depth is at least 250 meters below the ocean surface.

10. The system of claim 8, wherein the second offshore destination is an offshore oil rig.

11. A method for obtaining cooling water for use in offshore operations comprising:
    providing an extraction system comprising a flexible pipe having a first end and a second end, wherein the first end is operatively connected to an offshore platform, wherein the second end is extendable to at least 100 meters into the ocean and comprises a feedback system operable to measure (i) at least one measurement of ocean biology productivity selected from the group consisting of biomass amount, sunlight amount, and nutrient amount and (ii) temperature, and wherein a submersible pump is operatively connected to the second end;

extending the extraction system to a plurality of extraction depths between 100 meters and 1000 meters;

measuring the (i) at least one measurement of ocean biology productivity and (ii) temperature at each of the plurality of extraction depths;

selecting one of the plurality of extraction depths based on the measured ocean biology productivity and temperature; and pumping extracted water from the selected extraction depth to the offshore platform.

12. The method of claim 11, further comprising feeding the extracted water through a cooling water heat exchanger.

13. The method of claim 11, wherein the offshore platform is located at a first offshore location.

14. The method of claim 13, further comprising the step of transferring the extracted water to a second offshore location, wherein the second offshore location is operable to receive and use the extracted water as cooling water.

* * * * *